United States Patent
Asano

(10) Patent No.: US 6,258,169 B1
(45) Date of Patent: *Jul. 10, 2001

(54) CONTROL APPARATUS AND CONTROL METHOD

(75) Inventor: Kazuyuki Asano, Zama (JP)

(73) Assignee: Tokyo Electron Limited, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/069,141

(22) Filed: Apr. 29, 1998

(30) Foreign Application Priority Data

May 6, 1997 (JP) .................................................. 9-115942

(51) Int. Cl.$^7$ ............................. C23C 14/00; C23C 16/00
(52) U.S. Cl. ........................ 118/697; 118/698; 118/712; 118/719; 156/345; 204/298.03
(58) Field of Search ..................................... 118/712, 728, 118/729, 719, 697, 698; 156/345; 204/298.03

(56) References Cited

U.S. PATENT DOCUMENTS

| | | | |
|---|---|---|---|
| 4,715,921 | 12/1987 | Maher et al. | 156/345 |
| 4,717,461 | 1/1988 | Strahl et al. | 204/192.1 |
| 4,835,699 | 5/1989 | Mallard . | |
| 5,495,417 | 2/1996 | Fuduka et al. . | |
| 5,914,879 | * 6/1999 | Wang et al. | 364/468.18 |
| 5,933,526 | * 8/1999 | Sklarew | 382/189 |

FOREIGN PATENT DOCUMENTS

| | | |
|---|---|---|
| 0 282 697 | 9/1988 | (EP) . |
| 0 493 827 | 7/1992 | (EP) . |
| 0 740 241 | 10/1996 | (EP) . |
| 2 241 090 | 8/1991 | (GB) . |
| 6-333834 | 12/1994 | (JP) . |
| 7-50235 | 2/1995 | (JP) . |
| 7-297254 | 11/1995 | (JP) . |
| 7-297257 | 11/1995 | (JP) . |
| 08179817 | * 7/1996 | (JP) . |

* cited by examiner

Primary Examiner—Richard Bueker
(74) Attorney, Agent, or Firm—Oblon, Spivak, McClelland, Maier & Neustadt, P.C.

(57) ABSTRACT

A control apparatus comprises a plurality of process units operating in accordance with parameters, a storing section for storing parameters relevant to processings by the process units, a touch screen for setting predetermined parameters for the process units, and a parameter administration section. The parameter administration section sends corresponding one of the stored parameters to one of the process units in reply to a request issued thereby, transfers the set parameter to the process unit, and rewrites the parameters stored in the storing section to the parameters set by the setting section.

4 Claims, 8 Drawing Sheets

| 共通パラメータ編集 | スプーリング | 回線パラメータ | 画面選択 |
|---|---|---|---|
| 設定項目 | 現在値 | 再起動時の設定 | |
| 言語 | 英語 | 英語 | |
| WARM / COLD | COLD | COLD | |
| 使用可能オペレータレベル | サービスエンジニア | サービスエンジニア | |
| 起動時のオペレータレベル | オペレータ | オペレータ | |
| オペレータ名 | TEST | TEST | |
| キーボードタイプ | 106タイプ | 106タイプ | |
| シャットダウンの機能 | 選択可能 | 選択可能 | |
| シャットダウンのタイムアウト | 10秒 | 10秒 | |

| 終了 | 中止 | クリア |
|---|---|---|

FIG. 11

| Commom Prameter Edit | Spooling | Channel Parameter | Select Screen |
|---|---|---|---|

| Setting Menu | Current Value | Restart Setting |
|---|---|---|
| | | ⏪ ◀  ▶ ⏩ |
| Language | English | English |
| Warm / Cold | Cold | Cold |
| Max Operation Type | Service Operation | Service Operation |
| Initial Operation Type | Normal Operation | Normal Operation |
| Operator Name | TEST | TEST |
| Keyboard Type | Type – 106 | Type – 106 |
| Shutdown Functions | Select Enable | Select Enable |
| Shutdown Timeout | 10 Sec | 10 Sec |

| Close | Cancel | Clear |
|---|---|---|

F I G. 12

CONTROL APPARATUS AND CONTROL METHOD

BACKGROUND OF THE INVENTION

1. Field of the Invention

This invention relates to a control apparatus used for the process control of semiconductor device manufacturing equipment such as cluster tool equipment and a method therefor.

2. Discussion of the Background

In general, a process chamber for performing various processes such as a CVD (chemical vapor deposition) process or a sputtering process, an etching process, and a thermal oxide process for semiconductor wafers W is provided in the upstream thereof with a cassette chamber which has cassettes capable of containing a plurality (twenty five, for example) of the wafers W. The wafers are transferred from the cassette chamber to the process chamber via a transfer chamber.

A transfer chamber is generally connected to a plurality (three, for example) of process chambers such that the wafers are transferred from the cassette chamber to the process chambers via the transfer chamber so as to be subjected to the various processes.

In such a system, the process chamber must be sometimes replaced or cleaned due to the contamination by the deposition of the reactive product produced during the processes, for example. In that time, the operation of the process chamber must be stopped during the maintenance or cleaning. If one of the three process chambers needs to be maintained or cleaned, it is preferable in view of the manufacturing efficiency that the operation of only the process chamber which needs to be maintained or cleaned is stopped to be maintained or cleaned and the other process chambers continue to operate.

In the most case, however, the operations of the transfer chamber, the cassette chamber, and the process chambers are controlled by process control by which the operations of the chambers are closely related to each other. It is thus very difficult to control the units so as to stop the operation of only the specified one process chamber as described above. More specifically, when the operation of only specified one process chamber is desired to be stopped, not only the program for controlling the specified one process chamber but also the program for controlling all the process chambers inclusively and the programs for controlling the cassette chamber and the transfer chamber need to be changed.

SUMMARY OF THE INVENTION

It is an object of the present invention to provide a control apparatus capable of maintaining/cleaning the process units without stopping the process.

It is another object of the present invention to provide a control apparatus capable of easily changing the process routine.

According to the present invention, there is provided a control apparatus comprising a plurality of process units operating in accordance with parameters, a storing section for storing parameters relevant to processings of the process units, a setting section for setting predetermined parameters for the process units, and an administration section for sending the parameters, which are stored in the storing section and corresponds to one of the process units, in reply to a request issued by the one of the process units thereto, transferring one of the parameters set by the setting section to the corresponding one of the process units, and rewriting the parameters stored in the storing section to the parameter set by the setting section.

The control apparatus according to the present invention is constituted to store parameters respectively corresponding to the process units in advance, and in reply to a request from one of the process units, to send back the parameter corresponding to the requesting process unit. In addition, when the process unit is changed, if the parameter after the change of the process unit is set, the control apparatus sends the parameter to the process unit and simultaneously rewrites the parameter stored in the file in advance to the set parameter, and thus can change the process unit without stopping the process.

According to the present invention, there is provided a control apparatus comprising a plurality of process units operating in reply to parameters, a first storing section for storing parameters corresponding to the process units, a second storing section for storing parameters common to the process units, a setting section for setting the parameter for the process units, and an administration section for sending a parameter which is stored in one of the first and second storing sections and corresponds to one of the process units, in reply to a request issued by the one of the process units, transferring the one of the parameters set by the setting section to the process unit, and rewriting the parameters stored in one of the storing sections to the parameter set by the setting section.

According to the above-mentioned constitution, a common parameter common to the process units is stored, and thus the relevant parameters need not to be rewritten in stopping the process unit, and the memory region used to store the parameters can be reduced.

The present invention provides a control method comprising the steps of operating a plurality of process units in accordance with parameters, preparing a storing section for storing parameters relevant to processings of the process units, setting predetermined parameters for the process units, and sending a stored parameter or parameters corresponding to one of the process units, in reply to a request issued by the one of the process units, transferring one of the parameters set by the setting section to a corresponding one of the process units, and rewriting the parameters stored in the storing section to the parameter set by the setting section.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 11 shows one example of a display (in Japanese) according to the embodiment of the present invention.

FIG. 12 shows another example of the display according to the embodiment of the present invention, which is converted from the display in Japanese shown in FIG. 11 to display in English.

DETAILED DESCRIPTION OF THE PREFERRED EMBODIMENTS

The embodiment of the present invention will be described below with reference to the drawings.

Figure 1:
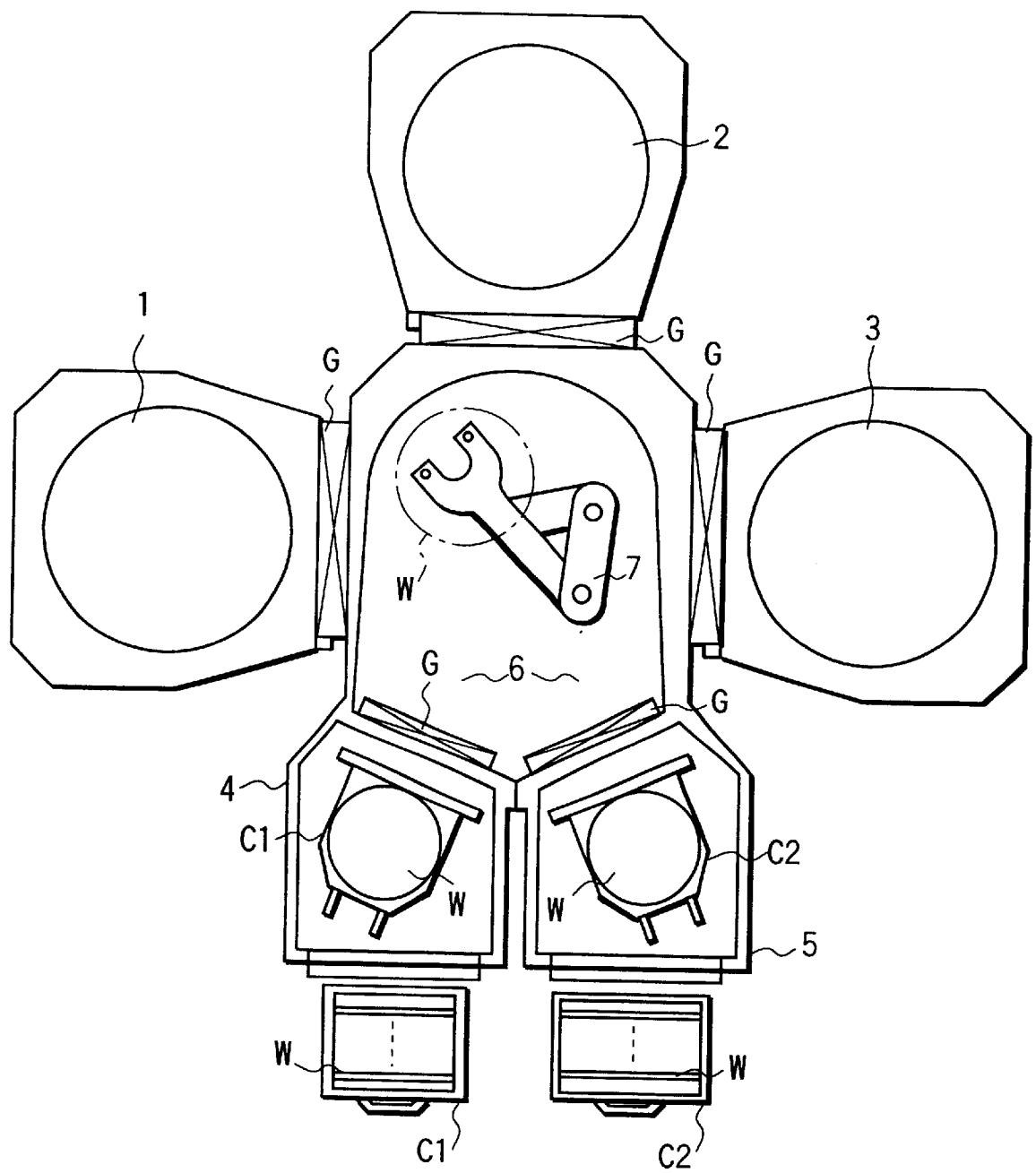
FIG. 1 is a plane view of a semiconductor wafer processing equipment according to an embodiment of the present invention.

According to the embodiment shown in FIG. 1, a semiconductor wafer processing equipment comprises a plurality (three in this embodiment) of process units (process chambers) 1, 2, and 3 for performing various processes such as CVD (chemical vapor deposition) process or a sputtering process, an etching process, and a thermal oxide process for semiconductor wafers W, cassette units (cassette chambers) 4 and 5 having cassettes C1 and C2 which can contain a plurality (twenty five, for example) of wafers W, and a transfer chamber (transfer unit) 6 for transferring the wafers from the cassette unit to the process units. The chambers in the equipment are connected to each other by gate valves G which can be desirably opened/closed. The transfer chamber is provided therein with a multi-joint type transfer arm 7 capable of bending and rotation operations, by which the wafers W are transferred between the units. When the cassettes C1 and C2 are taken into the cassette units 4 and 5, the cassettes C1 and C2 are rotated 90° to turn their outlets from which the wafers W are taken out from the cassettes to the center of the transfer unit 6 such that the transfer arm 7 can easily take the wafers W our from the cassettes.

Figure 2:
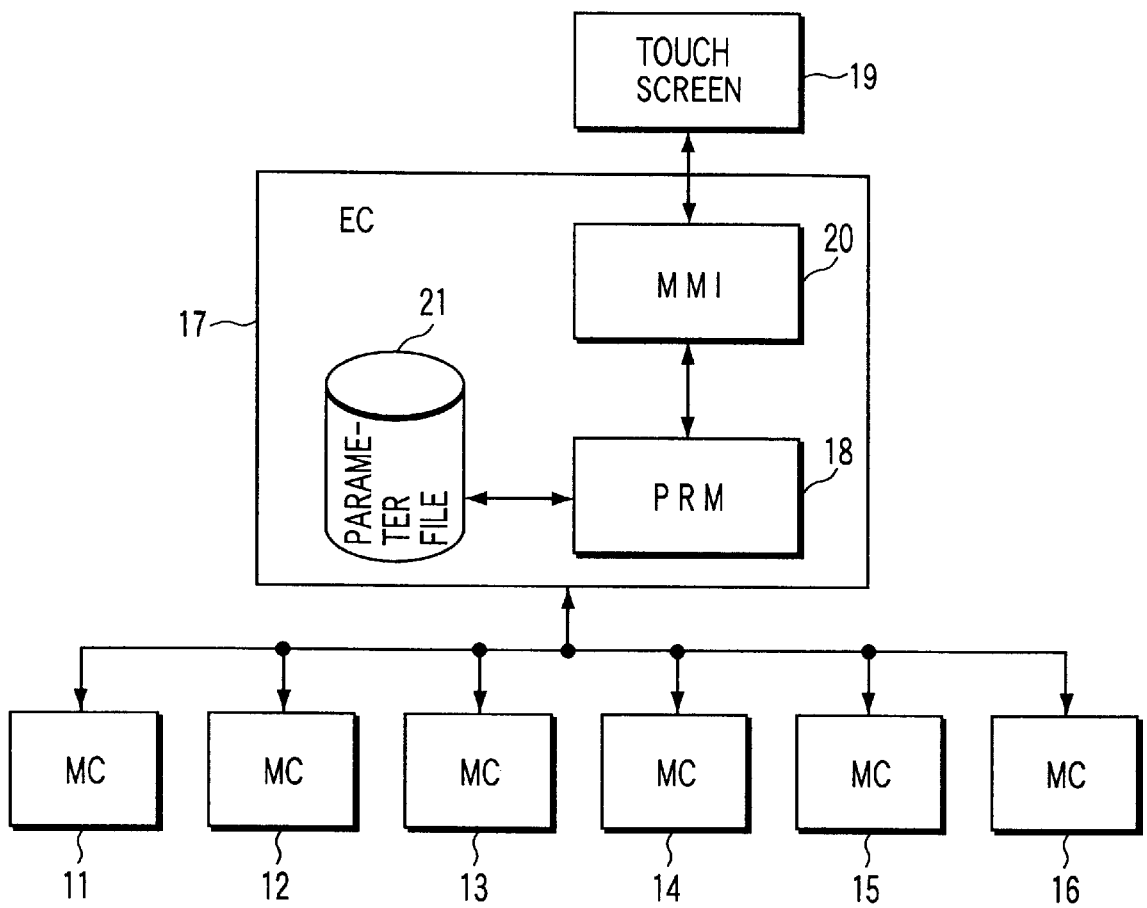
FIG. 2 is a block diagram showing the constitution of a control apparatus for controlling the semiconductor wafer processing equipment shown in FIG. 1.

FIG. 2 is a block diagram showing the constitution of a control apparatus for controlling the semiconductor wafer processing equipment having the above-mentioned structure shown in FIG. 1.

Machine controllers (MCs) 11–16 as slave control devices control the process units 1, 2, and 3, the cassettes units 4 and 5, and the transfer unit 6, respectively. All the machine controllers (MCs) 11–16 are inclusively controlled by a main controller (EC) 17 as a master control device. The main controller (EC) 17 includes a parameter administration unit (PRM) 18, a man machine interface (MMI) for connecting the main controller (EC) 17 and a touch screen 19, and a parameter file 21. The machine controllers 11–16 correspond to process units which operate in accordance with parameters.

Figure 3:
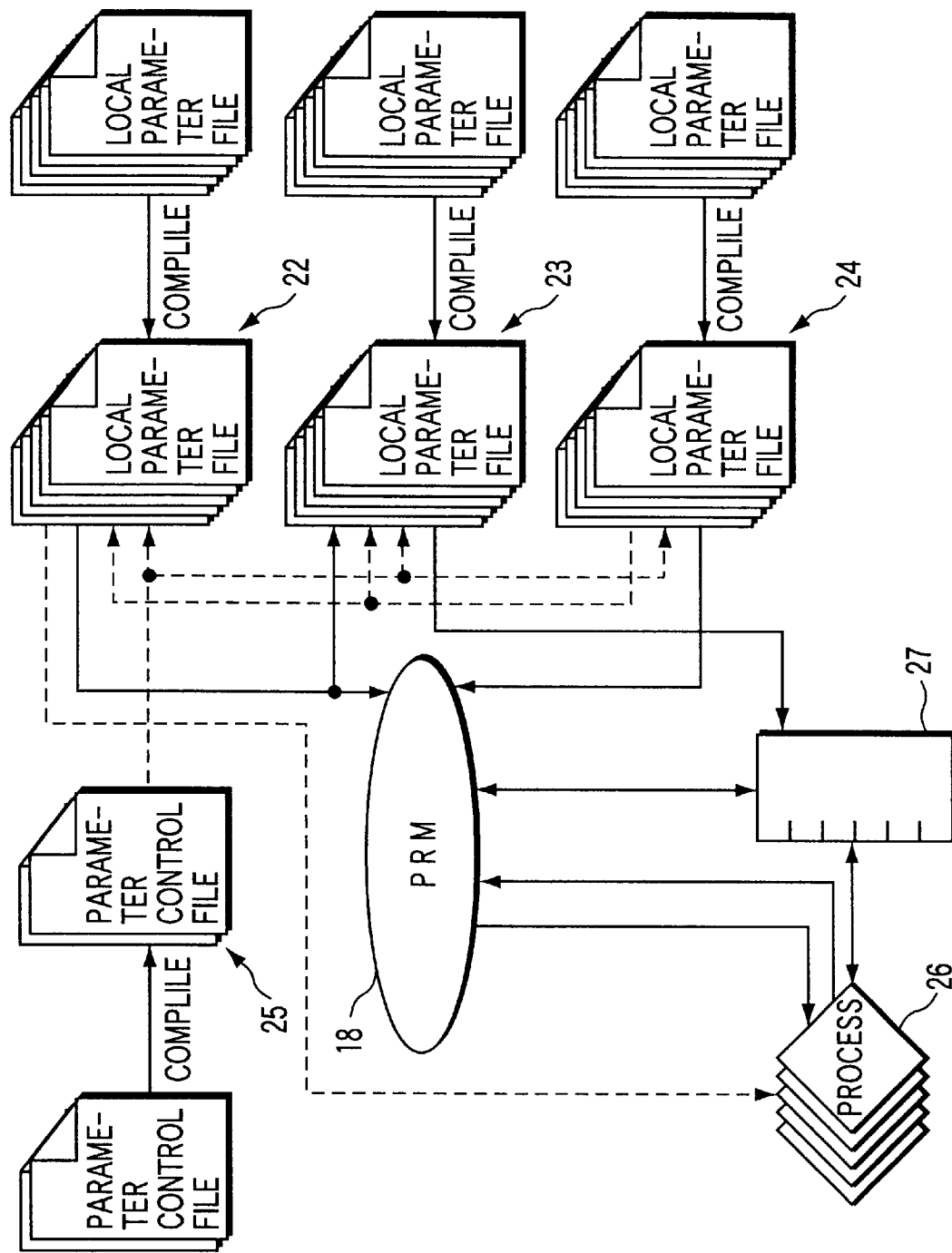
FIG. 3 shows the relationship between process units and a parameter administration section shown in FIG. 2 and parameters stored in a parameter file.

FIG. 3 shows the relationship between process units 26 (i.e., the machine controller 11–16), the parameter administration unit (PRM) 18, and parameters stored in the parameter file 21.

The parameter file 21 includes local parameter files 22, global parameter files 23, edit parameter files 24, and parameter control files 25. Each of the files has two types of parameter files: a source parameter file, and a parameter file which is formed by compiling the parameters in a text format. By adding the parameter file in the text format to the source parameter file, the present invention facilitates the edit operation.

The local parameter files 22 store parameters which respectively correspond to the process units 26 (i.e., the process units 11–16). Upon receiving requests from the process units 26, the parameters stored in the local parameter files are respectively transferred through the parameter administration unit (PRM) 18 and mapped in corresponding one of the process units 26.

The global parameter files 23 store common parameters common to the process units 11–16. The common parameters stored in the global parameter file 23 are transferred through the parameter administration unit (PRM) 18 and mapped in a global memory area 27 The parameters mapped in the global memory area 27 are read/written by the parameter administration unit (PRM) 18 and the process units 26.

The edit parameter files 24 store parameters which can be edited. It thus can be determined whether or not the parameter can be edited merely by referring to the edit parameter file 24.

The parameter control files 25 store parameters indicating the positions of the above-mentioned parameters.

Figure 4:
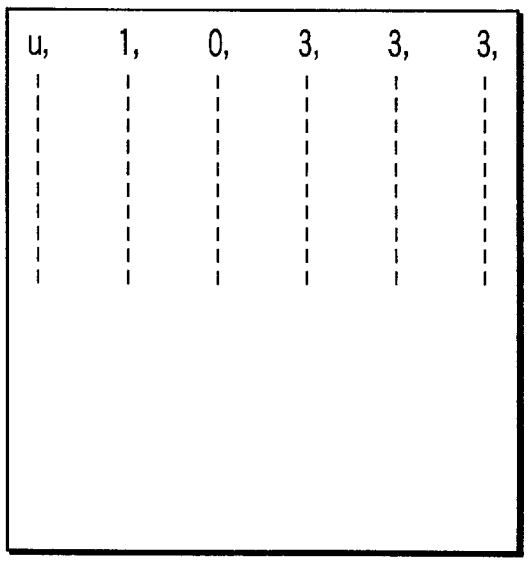
FIG. 4 shows an example of a local parameter file corresponding to all the process units shown in FIG. 2.

FIG. 4 shows an example of the local parameter file 22 which corresponds to all the process units.

From the left end of the first row of this file, "u" denotes a command, "1" denotes a row number, "0" denotes the minimum value of the number of the process units, "3" denotes the maximum value of the number of the process units, "3" denotes the default maximum value of the number of the process units, and "3" denotes the current value of the number of the process units.

Figures 5, 6A, 6B:
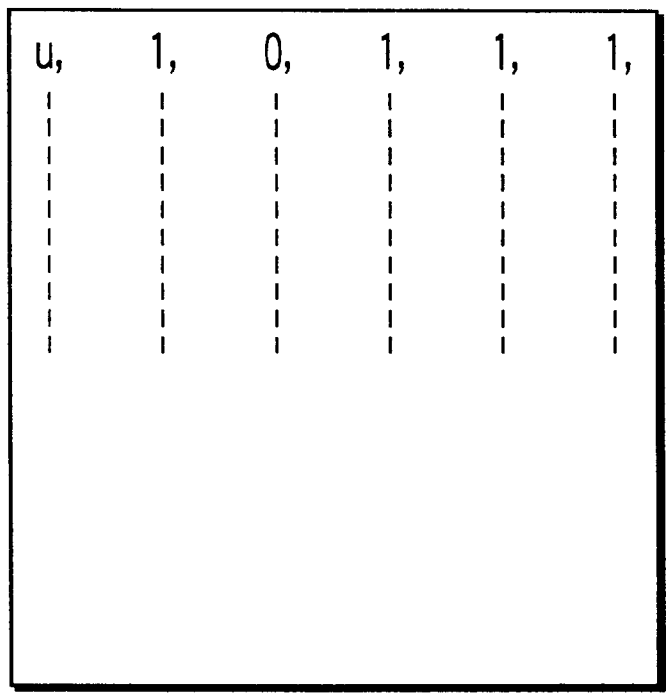
FIG. 5 shows an example of a local parameter file corresponding to one of the process units shown in FIG. 2.
FIGS. 6A and 6B show the data transmission format in the embodiment of the present invention.

FIG. 5 shows the other example of the local parameter file which corresponds to one of the process units.

From the left end of the first row of this file, "u" denotes a command, "1" denotes a row number, "0" denotes the value when the process unit is stopped (the minimum value of the number of the process unit), "1" denotes the value when the process unit operates (the maximum value of the number of the operating process unit), "1" denotes the default maximum value of the stop/operation of the process unit (in this case, the value is set at "1" indicating that the unit is in operation), and "1" denotes the current value of the stop/operation of the process unit (in this case, the value is set at "1" indicating that the unit is in operation).

FIG. 6A shows the data format of data transmitted from the parameter files to the process units 26 through the parameter administration unit (PRM) 18. According to this data format, a type of data is transferred at first, and then the current value, the maximum value, and the minimum value as described above, are transferred in order. FIG. 6B shows the transfer data of the file shown in FIG. 5.

Figure 7:
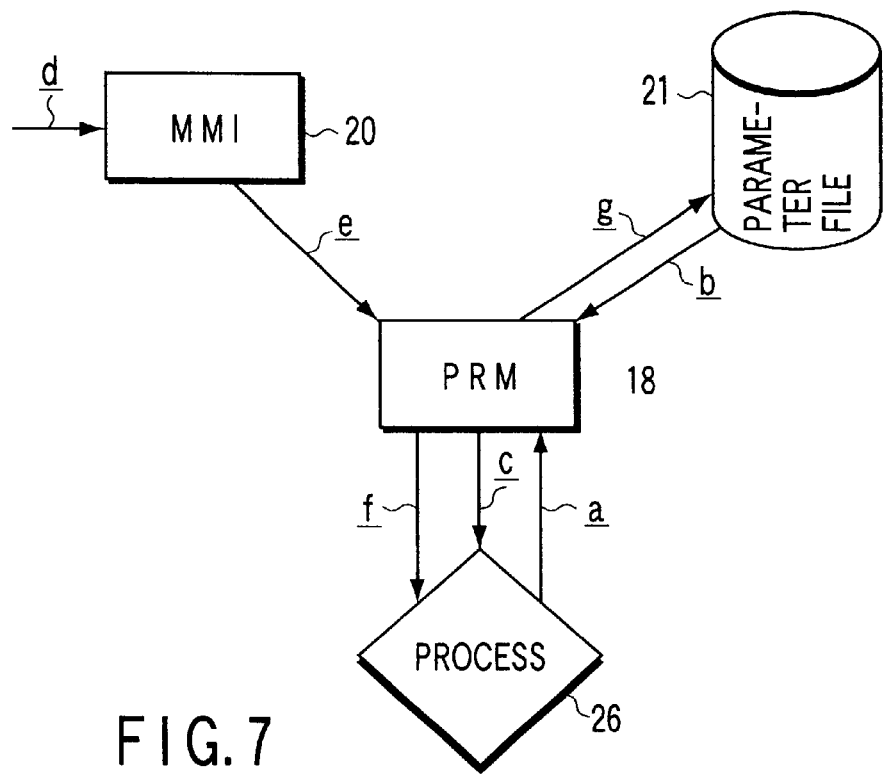
FIG. 7 is a schematic view explaining the starting/stopping operation of one of the process units according to the embodiment of the present invention.

FIG. 7 schematically shows the operation of the control apparatus when one of the process units 26 (the machine controllers 11–16) operates/stops. As shown in FIG. 7, when one of the process units 26 starts to operate, the one process unit 26 requires the parameter administration unit 18 to issue a parameter corresponding to the process unit (see FIG. 7, a). In response thereto, the parameter administration unit (PRM) 18 reads the corresponding parameter from the parameter file 21 (see FIG. 7, b) to transfer the parameter to the one process unit 26 requiring the parameter (see FIG. 7, c). In this manner, the one process unit 26 operates in accordance with the read parameter.

On the other hand, when one of the process units 26 needs to be stopped, the user inputs an instruction to stop the process unit 26 to be stopped through the touch screen (see FIG. 7, d). This instruction is input into the parameter administration unit 18 through the man machine interface (MMI) 20 (see FIG. 7, e). In response to the stop instruction, the parameter administration unit (PRM) 18 rewrites the parameter stored in the parameter file 21, which corresponds to the process unit 26 to be stopped (see FIG. 7, f). Simultaneously, the parameter administration unit (PRM) 18 transfers the parameter corresponding to the stop instruction to the process unit 26 to be stopped (see FIG. 7, g). Upon receiving the stop instruction, the process unit stops the operation. In this time, the other process units 26 continue to perform the process by the processing route from which the stopping process unit is excluded.

Figure 8:
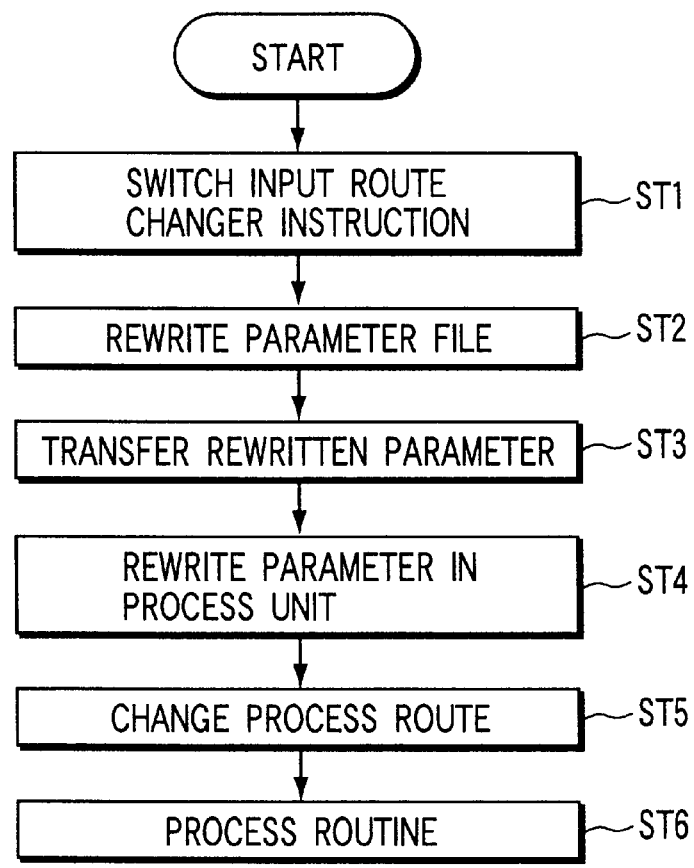
FIG. 8 is a flow chart explaining a processing route changing operation according to the embodiment of the present invention.

The above-mentioned stop operation of the process unit, i.e., the processing route changing operation, will be described more specifically with reference to FIG. 8.

Assuming that a process is performed by a processing route in which the process is performed from the cassette unit 4, the process unit 1, the process unit 2, the process unit 3, and to the cassette unit 5, in order. If only the process unit 3 needs to be stopped in this case, and the process needs to be continuously performed by another processing route in which the process is performed from the cassette unit 4, the process unit 1, the process unit 2, and to the cassette unit 5, in order, the stop instruction of stopping the process unit 3, i.e., the processing route changing instruction is input into the parameter administration unit 18 through the man machine interface 20 (ST1). In response to this instruction, the parameter administration unit 18 rewrites a parameter stored in the parameter file 21. More specifically, the parameter administration unit 18 rewrites the parameter file 21 in accordance with the processing route changing instruction to form the processing route in which the process is performed from the cassette unit 4, the process unit 1, the process unit 2, and to the cassette unit 5 (ST2). In this time, the parameter administration unit 18 transfers the rewritten parameter to the process unit 26 which needs the parameter (ST3). By transferring the parameter in this manner, the parameter of the corresponding process unit is rewritten (ST4), and the processing form in the process unit is changed (ST5). Thereafter, the process is continued by the changed processing route, i.e., the route not including the process unit 3 (ST6). Accordingly, when the maintenance or cleaning of the process unit 3 needs to be performed, it can be performed without stopping the other process units.

Figure 9A:
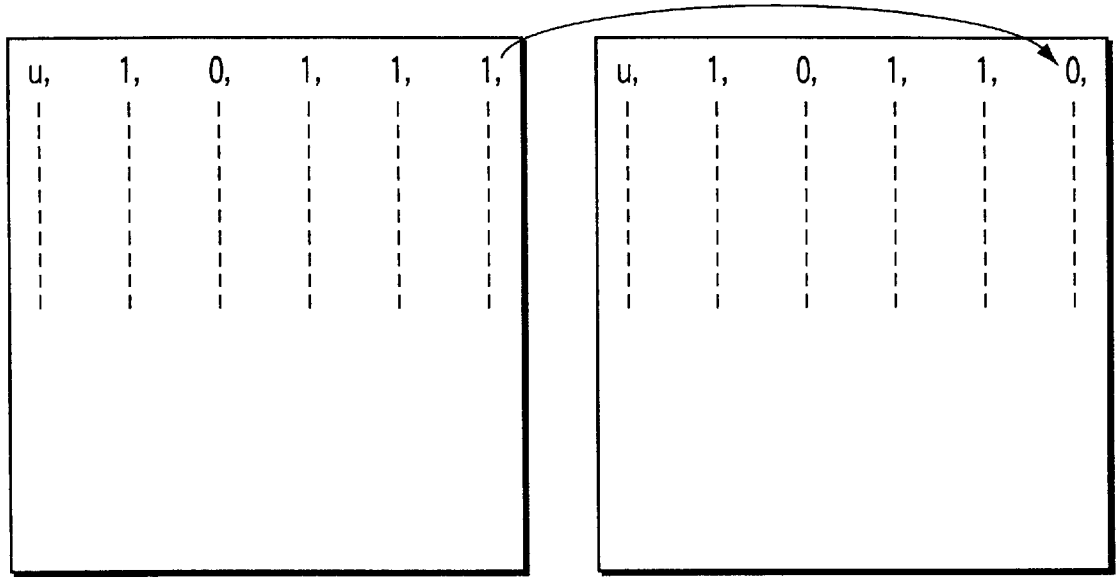
FIGS. 9A and 9B show the parameter rewriting operation when the process of one of the process units is stopped, in which the parameter corresponding to the stopped process unit is rewritten.
Figure 9B:
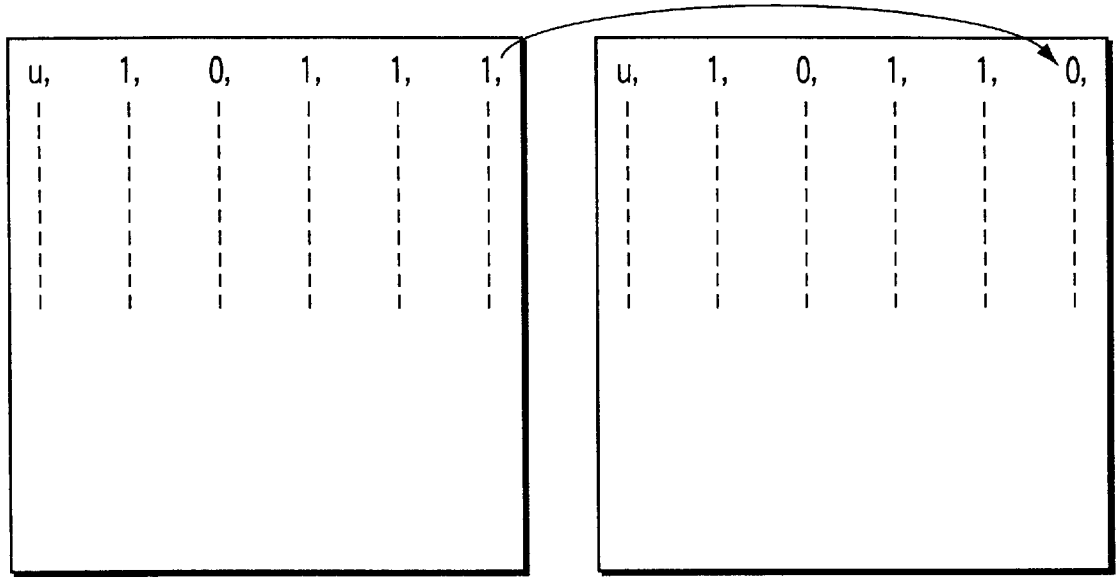

The rewriting operation of rewriting the parameter corresponding to the process unit to be stopped as described above is shown in FIGS. 9A and 9B. FIG. 9A shows a parameter file of a unit in operation, and FIG. 9B shows a parameter file of a stopped unit. As shown in these drawings, the current value at the right end of the first row is set at "1" in operation, and when the operation is stopped, the current value is turned to "0".

Figure 10A:
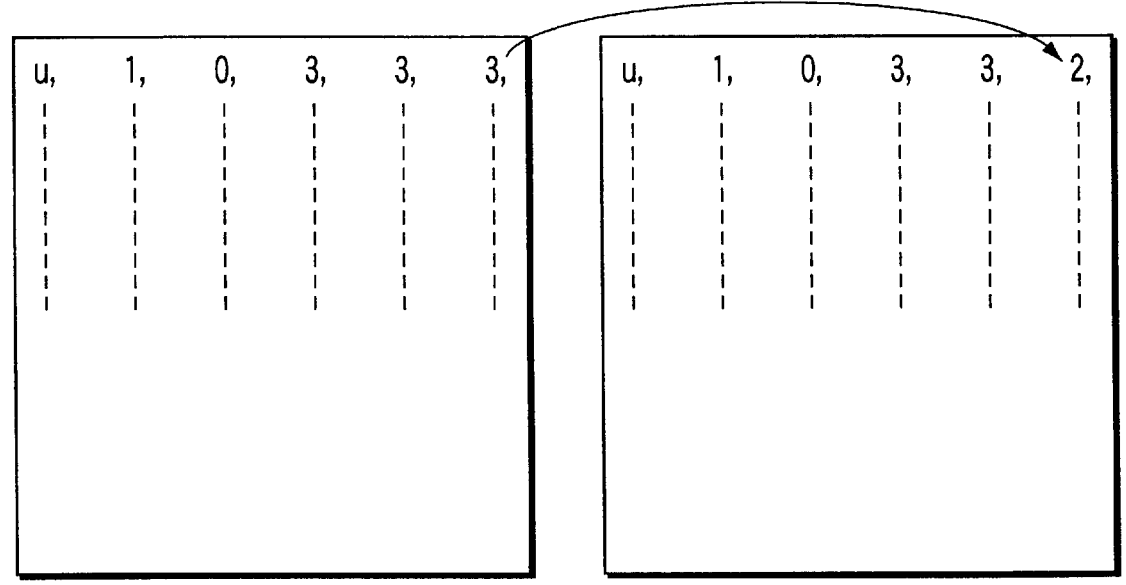
FIGS. 10A and 10B show the parameter rewriting operation when the process of all the process units are stopped, in which the parameters corresponding to all the process units are rewritten.
Figure 10B:
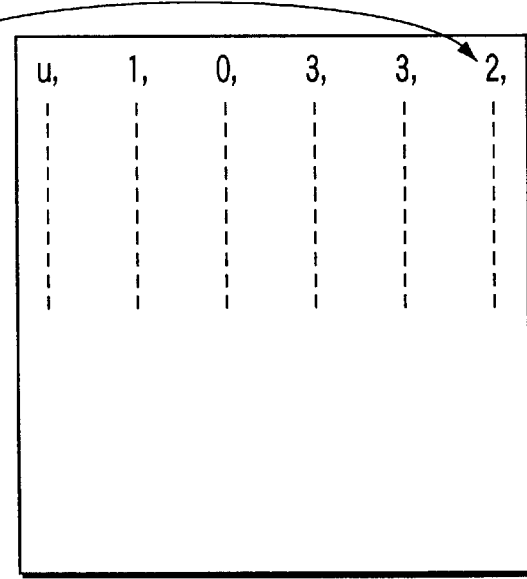

In addition to the parameter corresponding to the unit to be stopped, the parameters relevant thereto also must be rewritten. More specifically, when one of process units is stopped, the parameter in the file corresponding to all the process units and the parameter in the file corresponding to the transfer unit also need to be rewritten. The file corresponding to the all the process units are rewritten in such a manner as shown in FIGS. 10A and 10B. The file corresponding to all the process units in operation is formed as shown in FIG. 10A. When one of the process units is stopped and the other two process units are in operation, the file shown in FIG. 10B is formed. As shown in these drawings, when the three process units 1, 2, and 3 are in operation, the current value at the right end of the first row is set at "3", and when one of the process units is stopped, the current value is rewritten to "2". The files corresponding to the transfer unit and the like are also rewritten in the similar manner to the above.

In order to facilitate the above-mentioned rewriting operation of relevant files when the parameter of a file is rewritten, a file in which parameters relevant to each other are collected is prepared in advance. When a parameter is rewritten, the parameters relevant to the rewritten parameter can be easily rewritten by referring this file. Also, if a parameter which can be used as a common value common to all the process units is stored in the global parameter file 23, the parameters relevant thereto need not to be rewritten. In addition, by storing the parameters in the global parameter file 23, a memory region necessary for storing the parameters can be reduced in area.

According to the control apparatus of the present embodiment, when a process unit is stopped, the process units other than the process unit to be stopped need not to be stopped. In other words, one of the process units can be stopped while the other process units are in operation. Accordingly, when all the three process units 1, 2, and 3 need to be maintained, the maintenance of the system can be performed without stopping the entire system by performing the maintenance in the following manner: at first, the process unit 1 is stopped to be maintained while the process units 2 and 3 operate, then the process unit 2 is stopped to be maintained while the process units 1 and 3 operate, and the process unit 3 is stopped to be maintained while the process units 1 and 2 operate.

In the above embodiment, the parameter relevant to the process unit to be stopped is changed. It goes without saying that the parameters of the other processes not to be stopped can be also changed: e.g. parameters related to a display language. FIGS. 11 and 12 show the examples of displays in which the parameter related to a display language is changed. When the item of the "language" in the display shown in FIG. 11 is changed from "Japanese" to "English", the parameter in the parameter file corresponding to the "language" is rewritten to turn the display in Japanese into that in English, as shown in FIG. 12.

The control apparatus according to the present invention as described above can be applied to the other semiconductor device manufacturing apparatuses such as a clean track, and a LCD manufacturing apparatus.

As described above in detail, according to the present invention, when the objects to be processed, such as semiconductor wafers, are sequentially processed by a plurality of process units and specified one of the process units is excluded from the processing route, the processing route is changed to a new process route without stopping the entire process system merely by changing the parameters stored in the parameter file.

Further, the control apparatus according to the present invention is provided with a storing unit for storing the common parameters common to the process units, and thus the relevant parameters needs not to be rewritten in changing the processing route and the memory region used to store the parameters can be reduced in area.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A control apparatus, comprising:

a plurality of process units operating in accordance with parameters;

a storing section configured to store parameters for said process units, wherein said parameters include local parameters files, global parameter files, edit parameter files and control parameter files for said process units, each of said local parameters files, global parameter files, edit parameter files and control parameter files include a source parameter file and a compiled parameter file based on parameters that are compiled, said local parameter files include local parameters that correspond to each of said process units, respectively, said global parameter files include global parameters that correspond to all of said processing units, said edit parameter files include parameters that are editable, said local parameter files each include first and second parameter groups, said first parameter groups include a command, a row number, a minimum number of process units, a default maximum number of process units and a current number of process units, and said second parameter groups include a command, a row number, a number of stopped process units, a number of operating process units, a default value of stopped or operational process units and a current value of stopped or operational process units;

a setting section having a touch screen for setting predetermined parameters for the process units;

an administration section configured to send parameters from one of said local parameters files, global parameter files and parameter control files to a corresponding one of the process units in reply to a request issued by the corresponding one of the process units, to transfer one of the parameters set by the setting section to a corresponding one of the process units, and to rewrite the parameters stored in the storing section to the parameters set by the setting section; and a man-machine interface serving as an interface between the setting section and the administration section and configured to change parameters corresponding to different display languages for selectively changing the display languages in which items are displayed by the touch screen.

2. A control apparatus according to claim 1, wherein the process units include a plurality of process units for performing a chemical vapor deposition process or a sputtering process, an etching process, and a thermal oxidation process, and a plurality of cassette units having a plurality of cassettes capable of containing objects to be processed, and a transfer unit for transferring the objects.

3. A control apparatus, comprising:

a plurality of process units operating in accordance with parameters;

a storing section configured to store parameters for said process units, wherein said parameters include local parameters files, global parameter files, edit parameter files and control parameter files for said process units, each of said local parameters files, global parameter files, edit parameter files and control parameter files include a source parameter file and a compiled parameter file based on parameters that are compiled, said local parameter files include local parameters that correspond to each of said process units, respectively, said global parameter files include global parameters that correspond to all of said processing units, said edit parameter files include parameters that are editable, said local parameter files each include first and second parameter groups, said first parameter groups include a command, a row number, a minimum number of process units, a default maximum number of process units and a current number of process units, and said second parameter groups include a command, a row number, a number of stopped process units, a number of operating process units, a default value of stopped or operational process units and a current value of stopped or operational process units;

a setting section having a touch screen for setting predetermined parameters for the process units;

an administration section configured to send parameters from one of said local parameters files, global parameter files and parameter control files to a corresponding one of the process units in reply to a request issued by the corresponding one of the process units, to transfer one of the parameters set by the setting section to a corresponding one of the process units, and to rewrite the parameters stored in the storing section to the parameters set by the setting section; and a man-machine interface serving as an interface between the setting section and the administration section, wherein, when an instruction to stop one of the process units is issued through the touch screen, the administration section receives the instruction through the man-machine interface and transfers a parameter corresponding to the instruction to the process unit to be stopped, and said administration section stops an operation of the process unit to be stopped while other of the process units perform a process routine of the process unit to be stopped.

4. A control apparatus according to claim 1, wherein the man-machine interface changes a first language in which items are displayed by the touch screen to a second language.

* * * * *